(12) United States Patent
Kim et al.

(10) Patent No.: US 10,142,920 B2
(45) Date of Patent: Nov. 27, 2018

(54) METHOD AND APPARATUS FOR COMMUNICATION IN WIRELESS COMMUNICATION SYSTEM

(71) Applicant: Samsung Electronics Co., Ltd., Suwon-si, Gyeonggi-do (KR)

(72) Inventors: Soenghun Kim, Suwon-si (KR); Sangbum Kim, Suwon-si (KR); Jaehyuk Jang, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 115 days.

(21) Appl. No.: 15/243,372

(22) Filed: Aug. 22, 2016

(65) Prior Publication Data

US 2017/0064693 A1    Mar. 2, 2017

Related U.S. Application Data

(60) Provisional application No. 62/208,994, filed on Aug. 24, 2015.

(51) Int. Cl.
*H04W 4/00* (2018.01)
*H04W 48/12* (2009.01)
(Continued)

(52) U.S. Cl.
CPC ............ *H04W 48/12* (2013.01); *H04W 4/70* (2018.02); *H04W 72/048* (2013.01)

(58) Field of Classification Search
CPC ..... H04W 4/005; H04W 48/12; H04W 76/02; H04W 72/048
See application file for complete search history.

(56) References Cited

U.S. PATENT DOCUMENTS

2012/0269099 A1   10/2012   Chin et al.
2014/0029594 A1   1/2014   Lee et al.
(Continued)

FOREIGN PATENT DOCUMENTS

WO    2011-039636 A2    4/2011
WO    2014-084596 A1    6/2014
WO    WO-2016099361 A1 *   6/2016    ........ H04W 28/0268

OTHER PUBLICATIONS

3GPP (TSG-RAN WG2Meeting#91, R2-153215, Beijing, China, Aug. 24-18, 2015). (Year: 2015).*
(Continued)

*Primary Examiner* — Maharishi V Khirodhar
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The method includes receiving a first message including configuration information from a base station, setting an establishment cause based on whether the first message includes a first indicator indicating that a use of a value indicating a voice service as the establishment cause is requested, and transmitting a second message including the establishment cause for a radio resource control (RRC) connection request.

10 Claims, 13 Drawing Sheets

(51) Int. Cl.
*H04W 4/70* (2018.01)
*H04W 72/04* (2009.01)

(56) References Cited

U.S. PATENT DOCUMENTS

| | | |
|---|---|---|
| 2014/0378155 A1 | 12/2014 | Yu |
| 2015/0111556 A1* | 4/2015 | Hapsari ................. H04W 48/02 455/418 |
| 2015/0181404 A1 | 6/2015 | Hietalahti et al. |
| 2015/0304937 A1* | 10/2015 | Kim ...................... H04W 48/14 370/230 |
| 2016/0157290 A1* | 6/2016 | Lee ....................... H04W 48/18 370/329 |
| 2016/0278096 A1* | 9/2016 | Watfa ................ H04W 28/0205 |

OTHER PUBLICATIONS

3gpp (R2-153213, Nokia Networks, Meeting 91, Aug. 24-28, 2015, Beijing, China) (Year: 2015).*

* cited by examiner

METHOD AND APPARATUS FOR COMMUNICATION IN WIRELESS COMMUNICATION SYSTEM

CROSS-REFERENCE TO RELATED APPLICATION(S)

This application claims the benefit under 35 U.S.C. § 119(e) of a U.S. Provisional application filed on Aug. 24, 2015 in the U.S. Patent and Trademark Office and assigned Ser. No. 62/208,994, the entire disclosure of which is hereby incorporated by reference.

TECHNICAL FIELD

The present disclosure relates to a method and apparatus for establishing a radio communication channel in a wireless communication system.

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The long term evolution (LTE) system provides various Internet-based services including voice over internet protocol (VoIP) as an Internet-based voice call service. In particular, the VoIP service provided over LTE networks is referred to as VoLTE.

The voice call service is an essential service used by most users even at present when smartphones have gained popularity, and thus, telecommunication carriers are striving to improve the quality of VoIP service.

In the current LTE system, when a user attempts to access an LTE network to start communication, the user equipment (UE) only notifies the system that it is attempting to connect to the network for user data transmission (mobile-oriented call) without any detail of the purpose, i.e., the purpose of receiving voice service. Accordingly, the telecommunication carrier cannot determine whether the UE is attempting to connect to the system for an Internet service such as web-browsing or VoLTE and thus cannot perform call connection restriction control appropriately.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for distinguishing between an access attempt for a voice over long term evolution (VoLTE) service and an access attempt for a normal data service in a wireless mobile communication system.

In accordance with an aspect of the present disclosure, a radio communication channel establishment method of a terminal is provided for use in a wireless communication system. The method includes receiving a first message including configuration information from a base station, setting an establishment cause based on whether the first message includes a first indicator indicating that a use of a value indicating a voice service as the establishment connection is requested, and transmitting a second message including the establishment cause for a radio resource control (RRC) connection request.

In accordance with another aspect of the present disclosure, a method of a base station is provided for use in a wireless communication system. The method includes transmitting a first message including configuration information to a terminal and receiving a second message including an establishment cause for an RRC connection request from the terminal, wherein the establishment cause is set based on whether the first message includes a first indicator indicating that a use of a value indicating a voice service as the establishment cause is requested.

In accordance with another aspect of the present disclosure, a terminal is provided for use in a wireless communication system. The terminal includes a transceiver for transmitting and receiving signals and at least one processor configured to control for receiving a first message including configuration information from a base station, setting an establishment cause based on whether the first message includes a first indicator indicating that a use of a value indicating a voice service as the establishment cause is requested, and transmitting a second message including the establishment cause for an RRC connection request.

In accordance with another aspect of the present disclosure, a base station is provided for use in a wireless communication system. The base station includes a transceiver for transmitting and receiving signals and at least one processor configured to control for transmitting a first message including configuration information to a terminal, and receiving a second message including an establishment cause for an RRC connection request from the terminal, wherein the establishment cause is set based on whether the first message includes a first indicator indicating that a use of a value indicating a voice service as the establishment cause is requested.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
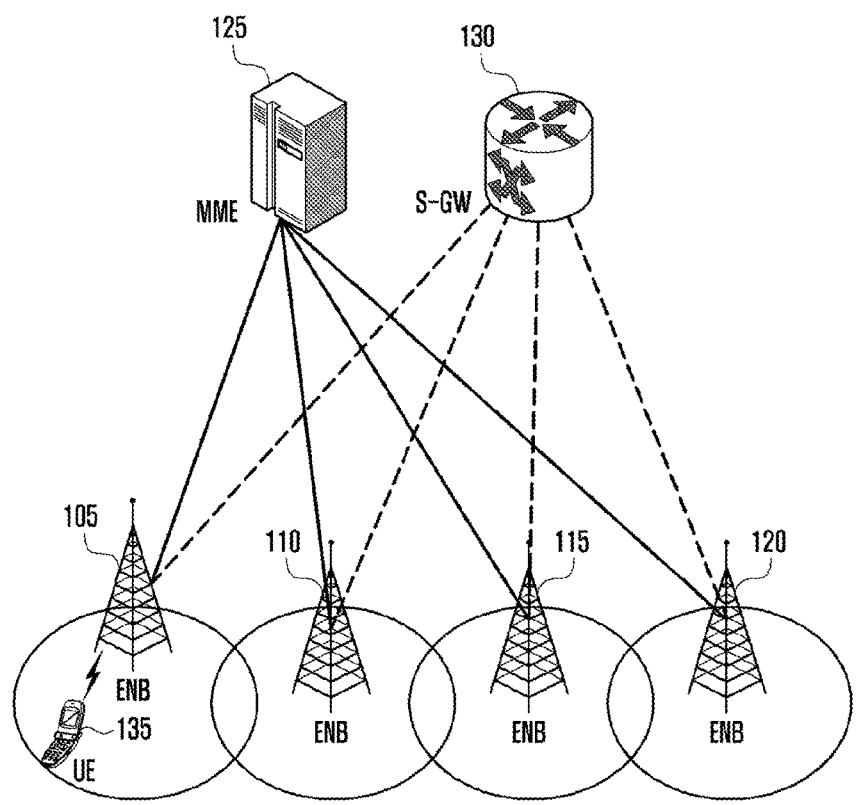
FIG. 1 is a diagram illustrating a long term evolution (LTE) system architecture to which the present disclosure is applied according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although the description is directed to an advanced evolved universal terrestrial radio access (EUTRA) (or long term evolution advanced (LTE-A)) supporting carrier aggregation (CA), it will be understood by those skilled in the art that the present disclosure can be applied to other communication systems having a similar technical background and channel format, with a slight modification, without departing from the spirit and scope of the present disclosure. For example, the subject matter of the present disclosure can be applied to a multicarrier high speed packet access (HSPA) system.

For the same reason, some elements are exaggerated, omitted, or simplified in the drawings and, in practice, the elements may have sizes and/or shapes different from those shown in the drawings. The same reference numbers are used throughout the drawings to refer to the same or like parts.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a non-transitory computer-readable memory that can direct a computer or other programmable data processing apparatus to function in a particular manner, such that the instructions stored in the non-transitory computer-readable memory produce an article of manufacture including instruction means that implement the function/act specified in the flowchart and/or block diagram block or blocks. The computer program instructions may also be loaded onto a computer or other programmable data processing apparatus to cause a series of operations to be performed on the computer or other programmable apparatus to produce a computer implemented process such that the instructions which execute on the computer or other programmable apparatus provide operations for implementing the functions/acts specified in the flowchart and/or block diagram block or blocks.

Furthermore, the respective block diagrams may illustrate parts of modules, segments, or codes including at least one or more executable instructions for performing specific logic function(s). Moreover, it should be noted that the functions of the blocks may be performed in different order in several modifications. For example, two successive blocks may be performed substantially at the same time, or may be performed in reverse order according to their functions.

FIG. 1 is a diagram illustrating long term evolution (LTE) system architecture to which the present disclosure is applied according to an embodiment of the present disclosure.

According to various embodiments of the present disclosure, the term "module", means, but is not limited to, a software or hardware component, such as a field programmable gate array (FPGA) or application specific integrated circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more central processing units (CPUs) in a device or a secure multimedia card. Referring to FIG. 1, the radio access network (RAN) 100 of the LTE system includes evolved Node Bs (eNBs, or base stations) 105, 110, 115, and 120; a mobility management entity (MME) 125; and a serving gateway (S-GW) 130. The user equipment (UE, or terminal) 135 connects to an external network via the eNBs 105, 110, 115, and 120 and the S-GW 130.

Figure 2:
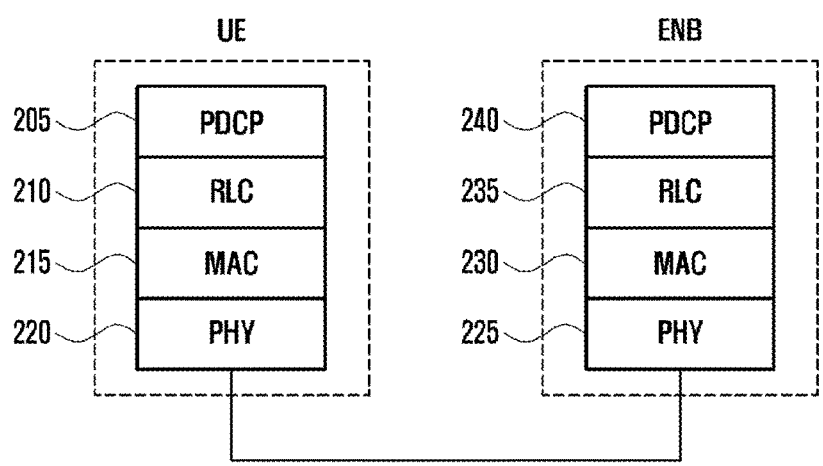
FIG. 2 is a diagram illustrating a protocol stack of an interface between a user equipment (UE) and an evolved Node B (eNB) in the LTE system according to various embodiments of the present application.

The eNBs 105, 110, 115, and 120 are equivalent to the legacy node Bs of the universal mobile telecommunications system (UMTS). The UE 135 connects to one of the eNBs via a radio channel, and the eNB has more control functions than the legacy node B. In the LTE system, all user traffic including real time services such as voice over IP (VoIP) is served through a shared channel Thus, there is a need for an entity that is capable of collecting per-UE state information (such as buffer status, allowed transmission power state, and channel status) and scheduling the UEs based on the state information, and the eNBs 105, 110, 115, and 120 are responsible for these functions. Typically, one eNB has multiple cells. The LTE system adopts orthogonal frequency division multiplexing (OFDM) as a radio access technology in order to secure a data rate of up to 100 Mbps in a 20 MHz bandwidth. The LTE system also adopts adaptive modulation and coding (AMC) to determine the modulation scheme and channel coding rate in adaptation to the channel condition of the UE. The S-GW 130 is an entity that provides data bearers to establish and release data bearers under the control of the MME 125. The MME 125 is responsible for various control functions and maintains connections with a plurality of eNBs. FIG. 2 is a diagram illustrating a protocol stack of an interface between a UE and an eNB in the LTE system according to various embodiments of the present disclosure. Referring to FIG. 2, the protocol stack of the interface between the UE and the eNB in the LTE system includes a plurality of protocol layers stacked from the bottom to the top: physical layer denoted by reference numbers 220 and 225, medium access control (MAC) layer denoted by reference numbers 215 and 230, radio link control (RLC) layer denoted by reference numbers 210 and 235, and packet data convergence control (PDCP) layer denoted by reference numbers 205 and 240. The PDCP layer denoted by reference numbers 205 and 240 takes charge of compressing/decompressing an IP header, and the RLC layer denoted by reference numbers 210 and 235 takes charge of segmenting a PDCP packet data unit (PDU) into segments of appropriate size. The MAC layer denoted by reference numbers 215 and 230 allows for connection of multiple RLC entities and takes charge of multiplexing RLC PDUs from the RLC layer into a MAC PDU and demultiplexing a MAC PDU into RLC PDUs. The PHY layer denoted by reference numbers 220 and 225 takes charge of channel-coding and modulation on higher layer data to generate and transmit OFDM symbols over a radio channel and demodulation and channel-decoding on OFDM symbols received over the radio channel to deliver the decoded data to the higher layers.

According to an embodiment, the LTE system may use uplink modulation schemes of quadrature phase shift keying (QPSK), 16QAM (quadrature amplitude modulation), and 64QAM. Among them, 64QAM may be adopted for high end UEs because of implementation complexity and high implementation costs.

The modulation scheme is one of the important criteria for determining the size of a transport block (TB) transmitted by the UE, and the modulation schemes and TB sizes may be shared between the UE and eNB in the form of a table.

Since it may increase the complexities of the UE and eNB to define a low order modulation scheme table and a high order modulation scheme table separately, an embodiment of the present disclosure proposes defining a table with the three modulation schemes.

According to an embodiment of the present disclosure, the eNB may notify the UE of an integer called modulation coding scheme (MCS) index, and the UE may perform uplink physical uplink shared channel (PUSCH) transmission by applying the modulation scheme indicated by the MCS index.

At this time, the index indicates a TB size and a modulation scheme and, in particular, a high index may indicate the 64QAM. A 64QAM capable UE operates normally in the cell using 64QAM, but it is useless to apply the 64QAM to the cell or UE without 64QAM capability. However, it may become necessary to use a TB size indicated by a high index even though the 64QAM is not supported; and, in this case, 16QAM may be applied for PUSCH transmission instead of the 64QAM.

The present disclosure makes it possible to determine whether to apply the 64QAM or 16QAM upon receipt of the MCS index indicating 64QAM by combining 64QAM information obtained from the system information broadcast by the eNB and the UE capability information reported to the eNB.

The 64QAM capability may be defined in such a way that the UE category and 64QAM supportability are indicated separately. For example, by defining a UE category mandating 64QAM and a UE category supporting the 64QAM selectively, it is possible to provide a means capable of meeting market demand flexibly. In the following description, the category supporting 64QAM mandatorily is referred to as the first category, and the category supporting the 64QAM selectively is referred to the second category.

The eNB may transmit the information indicating whether to apply the 64QAM to the first-category UE and second-category UE separately.

Figure 3:
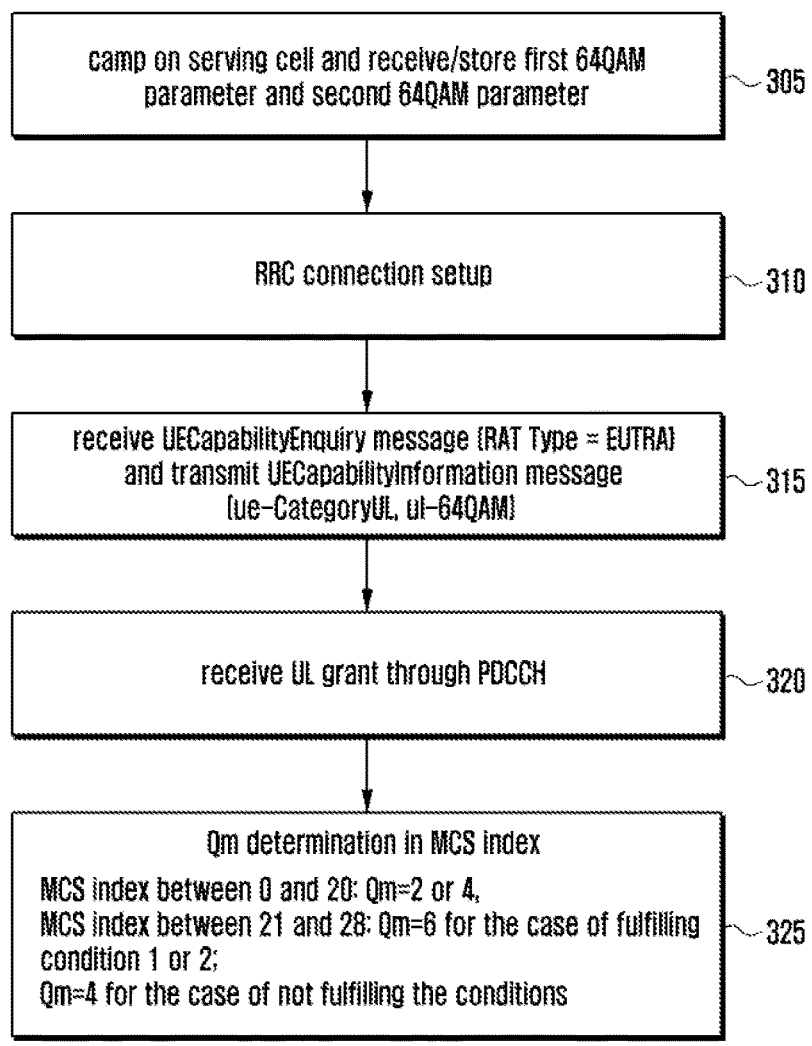
FIG. 3 is a flowchart illustrating a UE operation according to an embodiment of the present disclosure.

FIG. 3 is a flowchart illustrating a UE operation according to an embodiment of the present disclosure.

Referring to FIG. 3, the UE may camp on a serving cell and receive system information from the service cell at operation 305. The system information is the information necessary for the UE to transmit/receive data and perform necessary operations in the corresponding cell, and different information items are carried in predetermined system information blocks (SIBs).

The system information may include the first and second 64QAM parameters, and the UE may receive and store the first and second 64QAM parameters. It is assumed that the stored information is valid until new information is received or a predetermined time period elapses.

The system information may be transmitted as follows.

The first and second 64QAM parameters may be contained in the same system information. The system information may be SIB2.

The first 64QAM parameter may be transmitted/received singly or along with the second 64QAM parameter.

The first 64QAM parameter may indicate whether the UE belonging to the first category is allowed for use of 64QAM in the corresponding cell.

The second 64 parameter may indicate whether the UE supporting 64QAM in at least one band among the UEs belonging to the second category is allowed for use of the 64QAM in the corresponding cell.

It may become necessary for the UE to establish an RRC connection in the service cell for a certain reason at operation 310. In this case, the higher layer of the UE may request to the RRC layer for an RRC connection setup. The RRC connection setup may be triggered by a response to a paging message, occurrence of data transmission necessity at the UE, and a user's service initiation. The UE may configure an RRC connection in the serving cell.

The UE may receive a UECapabilityEnquiry from the eNB and transmit a UECapabilityInformation message to the eNB at operation 515. At this operation, the UE may report its capability to the eNB; and, if the eNB knows the UE capability, this operation may be omitted. If the UECapabilityEnquiry message with the Radio Access Technology (RAT) type set to evolved universal terrestrial radio access (EUTRA) is received from the eNB, the UE may transmit the UECapabilityInformation message including its capability concerning EUTRA to the eNB. This message may include the ue-Category indicating the category of the UE and the ue-CategoryUL indicating the UL category of the UE. The ue-Category may partially belong to the first category and the ue-CategoryUL may partially belong to the second category. The UECapabilityInformation message may also include ul-64QAM information per band supporting 64QAM among the bands supported by the UE.

The ue-Category may be defined as shown in Table 1 and, for example, ue-Category 5 and ue-Category 8 may belong to the first category.

TABLE 1

| UE Category | Maximum number of UL-SCH transport block bits transmitted within a TTI | Maximum number of bits of an UL-SCH transport block transmitted within a TTI | Support for 64QAM in UL |
| --- | --- | --- | --- |
| Category 1 | 5160 | 5160 | No |
| Category 2 | 25456 | 25456 | No |
| Category 3 | 51024 | 51024 | No |
| Category 4 | 51024 | 51024 | No |
| Category 5 | 75376 | 75376 | Yes |
| Category 6 | 51024 | 51024 | No |
| Category 7 | 102048 | 51024 | No |
| Category 8 | 1497760 | 149776 | Yes |
| Category 9 | 51024 | 51024 | No |
| Category 10 | 102048 | 51024 | No |
| Category 11 | 51024 | 51024 | No |
| Category 12 | 102048 | 51024 | No |

The UE may report an uplink UE category, i.e., ue-CategoryUL, in addition to ue-Category. The ue-CategoryUL may be defined as shown in table 2.

TABLE 2

| UE UL Category | Maximum number of UL-SCH transport block bits transmitted within a TTI | Maximum number of bits of an UL-SCH transport block transmitted within a TTI | Support for 64QAM in UL |
| --- | --- | --- | --- |
| UL Category 0 | 1000 | 1000 | No |
| UL Category 3 | 51024 | 51024 | No |
| UL Category 5 | 75376 | 75376 | Yes |
| UL Category 7 | 102048 | 51024 | No |
| UL Category 8 | 1497760 | 149776 | Yes |
| UL Category 13 | 150752 | 75376 | Yes |

Among the ue-categoryUL categories, category 13 may belong to the second category supporting 64QAM selectively as described above.

The UE that reports the second category as ue-CategoryUL sets a ul-64QAM parameter to "supported" for at least one band supporting 64QAM to indicate whether 64QAM is supported. Although the second category is reported as ue-CategoryUL, the UE that does not support 64QAM may not report the ul-64QAM parameter.

The UE receives a UL grant indicating new uplink transmission through a physical downlink control channel (PDCCH) at operation 320. The UL grant may include an MCS index indicating the modulation scheme and transport block size for use in PUSCH transmission. For example, the relationship between the MCS index and modulation scheme may be defined as shown in Table 3.

TABLE 3

| MCS Index $I_{MCS}$ | Modulation Order $Q_m'$ | TBS Index $I_{TBS}$ | Redundancy Version $rv_{idx}$ |
|---|---|---|---|
| 0 | 2 | 0 | 0 |
| 1 | 2 | 1 | 0 |
| 2 | 2 | 2 | 0 |
| 3 | 2 | 3 | 0 |
| 4 | 2 | 4 | 0 |
| 5 | 2 | 5 | 0 |
| 6 | 2 | 6 | 0 |
| 7 | 2 | 7 | 0 |
| 8 | 2 | 8 | 0 |
| 9 | 2 | 9 | 0 |
| 10 | 2 | 10 | 0 |
| 11 | 4 | 10 | 0 |
| 12 | 4 | 11 | 0 |
| 13 | 4 | 12 | 0 |
| 14 | 4 | 13 | 0 |
| 15 | 4 | 14 | 0 |
| 16 | 4 | 15 | 0 |
| 17 | 4 | 16 | 0 |
| 18 | 4 | 17 | 0 |
| 19 | 4 | 18 | 0 |
| 20 | 4 | 19 | 0 |
| 21 | 6 | 19 | 0 |
| 22 | 6 | 20 | 0 |
| 23 | 6 | 21 | 0 |
| 24 | 6 | 22 | 0 |
| 25 | 6 | 23 | 0 |
| 26 | 6 | 24 | 0 |
| 27 | 6 | 25 | 0 |
| 28 | 6 | 26 | 0 |
| 29 | reserved | | 1 |
| 30 | | | 2 |
| 31 | | | 3 |

The UE may determine the modulation scheme at operation 325 by using/referencing the MCS index, the first 64QAM parameter, the second 64QAM parameter, the ue-Category, the ue-CategoryUL, and the ul-64QAM. The modulation scheme matches an integer called Qm one by one, and Qm 2 corresponds to QPSK, Qm 4 to 16QAM, and Qm 6 to 64QAM.

For example, the UE may determine whether the MCS index belongs to the first group and, if so, uses a modulation scheme (QPSK or 16QAM) corresponding to the MCS index in the MCS index table. The first group has the range of 0~20.

For example, if the MCS index belongs to the second group, the UE may determine whether conditions 1 to 4 to be defined below are fulfilled and apply the modulation scheme (64QAM) indicated in Table 3 for the case of fulfilling condition 1 or 2 and a modulation scheme (16QAM) which is not any of the modulation schemes indicated in the MCS index table for the case of fulfilling condition 3 or 4. If condition 1 or 2 is fulfilled, this means that the UE supports 64QAM transmission and QPSK and 16QAM transmissions are not configured at the higher layer. The second group has the range of 21~28.

The first condition
The ue-Category of the UE belongs to the first category.
The first 64QAM parameter is set to TRUE in the system information.
The second condition
The ue-CategoryUL of the UE belongs to the second category.
The UE reports the ul-64QAM set to "supported" for at least one band.
The second 64QAM parameter is set to TRUE in the system information.

The third condition
The ue-Category of the UE belongs to the first category, the ue-CategoryUL is not reported, and the first 64QAM parameter is set to FALSE; or
the ue-Category of the UE does not belong to the first category, and the ue-CategoryUL of the UE does not belong to the second category.
The fourth condition
The ue-Category of the UE does not belong to the first category, the ue-CategoryUL belongs to the second category, and the second 64QAM parameter is set to FALSE; or
the ue-Category of the UE does not belong to the first category, the ue-CategoryUL belongs to the second category, and the UE does not report ul-64QAM set to "supported" for even a single band.

For example, if the MCS index belongs to the third group, the UE may apply the same modulation scheme as the modulation scheme used before. The third group has a range of 29~31.

The UE may apply the determined modulation scheme for PUSCH transmission.

Figure 4:
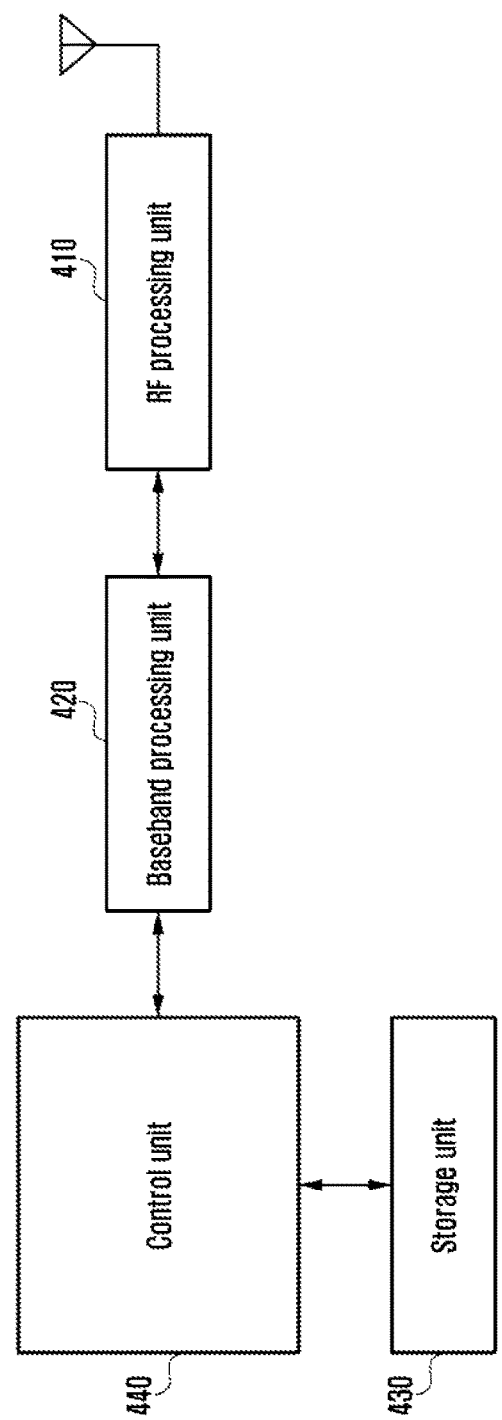
FIG. 4 is a block diagram illustrating a configuration of a UE in a wireless communication system according to an embodiment of the present disclosure.

FIG. 4 is a block diagram illustrating a configuration of a UE in a wireless communication system according to an embodiment of the present disclosure.

Referring to FIG. 4, the UE includes a radio frequency (RF) processing unit 410, a baseband processing unit 420, a storage unit 430, and a control unit 440.

The RF processing unit 410 takes charge of band conversion and amplification of a signal and transmitting/receiving the signal over a radio channel. That is, the RF processing unit 410 up-converts a baseband signal generated by the baseband processing unit 420 to an RF band signal, which is transmitted through an antenna, and down-converts an RF band signal received through the antenna to a baseband signal. For example, the RF processing unit 410 may include a transmission filter, a reception filter, an amplifier, a mixer, an oscillator, a digital to analog converter (DAC), and an analog to digital converter (ADC). Although one antenna is depicted in FIG. 4, the UE may be provided with a plurality of antennas. Also, the RF processing unit 410 may include a plurality of RF chains. The RF processing unit 410 may carry out beamforming. For beamforming, the RF processing unit 410 may adjust the phase and size of the signals transmitted through the plural antennas or antenna elements.

The baseband processing unit 420 takes charge of conversion between baseband signals and bit streams according to the physical layer standard of the system. For example, the baseband processing unit 420 encodes and modulates a transmission bit stream to complex conjugate symbols in the data transmission mode. The baseband processing unit 420 also demodulates and decodes the baseband signal from the RF processing unit 410 to recover the received bit stream in the data reception mode. In the case of adopting the orthogonal frequency division multiplexing (OFDM), the baseband processing unit 420 encodes and modulates the transmission bit stream to generate complex conjugate symbols, maps the complex conjugate symbols to subcarriers, performs an inverse fast Fourier transform (IFFT) operation, and inserts a cyclic prefix (CP) to generate the OFDM symbols in the data transmission mode. Also, the baseband processing unit 420 separates the baseband signal from the RF processing unit 410 in a unit of an OFDM symbol, recovers signals mapped to the subcarriers through a fast Fourier transform (FFT) operation, and demodulates and decodes the signals to recover the received bit stream in the data reception mode.

The baseband processing unit 420 and the RF processing unit 410 transmit and receive signals as described above. Accordingly, the base processing unit 420 and the RF processing unit 410 may be interchangeably referred to as a transmitter/receiver, a transceiver, and a communication unit. At least one of the baseband processing unit 420 and the RF processing unit 410 may include a plurality of communication modules for supporting different radio access technologies. At least one of the baseband processing unit 420 and the RF processing unit 410 may include a plurality of communication modules for different frequency band signals. For example, the radio access technologies may include a wireless LAN (WLAN) (e.g., IEEE 802.11) technology and a cellular network (e.g., LTE) technology. The frequency bands may include a super high frequency (SHF) band (e.g. 2.5 GHz band, 5 GHz band, and millimeter wave (e.g., 60 Hz) band.

The storage unit 430 stores data including basic programs for operation of the UE, application programs, and setting information. In particular, the storage unit 430 may store the information on an access node which performs radio communication using a predetermined radio access technology. The storage unit 430 also may provide the stored data in reply to a request from the control unit 440.

The control unit 440 controls overall operations of the UE. For example, the control unit 440 controls the baseband processing unit 420 and the RF processing unit 410 to transmit/receive signals. The control unit 440 may also write and read data to and from the storage unit 430. For this purpose, the control unit 440 may include at least one processor. For example, the control unit 440 may include a communication processor (CP), which is responsible for controlling communication, and an application processor (AP), which is responsible for controlling application programs on the higher layer. According to an embodiment of the present disclosure, the control unit 440 may control the UE to perform the operations and procedures described with reference to FIG. 3.

Figure 5:
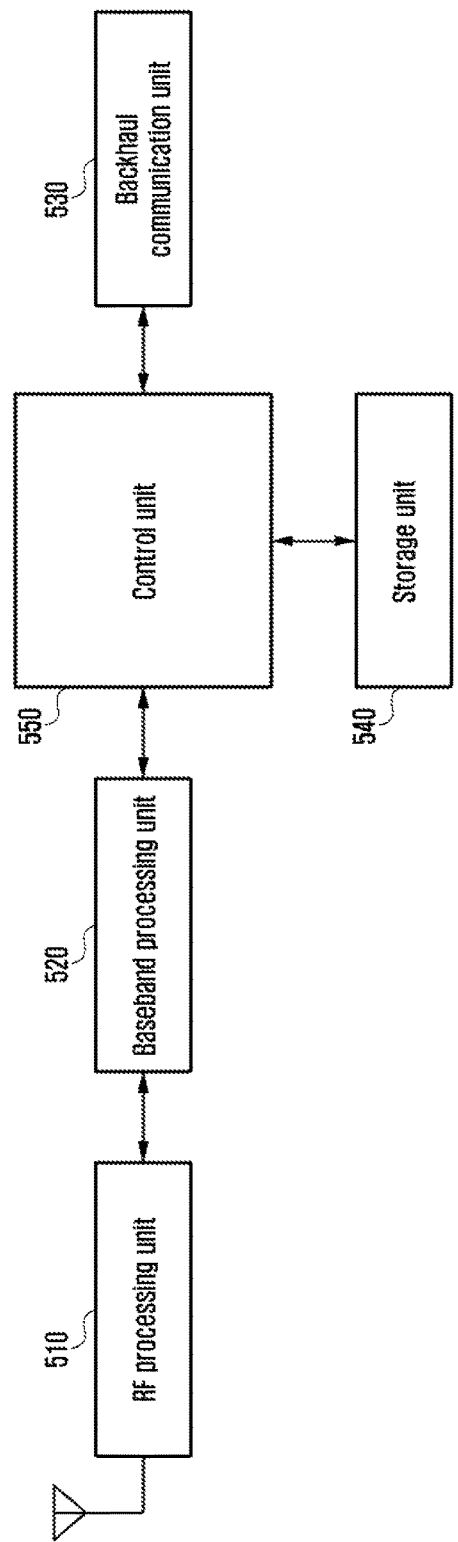
FIG. 5 is a block diagram illustrating a configuration of an eNB according to an embodiment of the present disclosure.

FIG. 5 is a block diagram illustrating a configuration of an eNB in a wireless communication system according to an embodiment of the present disclosure.

Referring to FIG. 5, the eNB may include an RF processing unit 510, a baseband processing unit 520, a backhaul communication unit 530, a storage unit 540, and a control unit 550.

The RF processing unit 510 takes charge of band conversion and amplification of a signal and transmitting/receiving the signal over a radio channel. That is, the RF processing unit 510 up-converts a baseband signal generated by the baseband processing unit 520 to an RF band signal, which is transmitted through an antenna, and down-converts an RF band signal received through the antenna to a baseband signal. For example, the RF processing unit 510 may include a transmission filter, a reception filter, an amplifier, a mixer, an oscillator, a DAC, and an ADC. Although one antenna is depicted in FIG. 5, the eNB may be provided with a plurality of antennas. In addition, the RF processing unit 510 may include a plurality of RF chains. The RF processing unit 510 may carry out beamforming. For beamforming, the RF processing unit 510 may adjust the phase and size of the signals transmitted through the plural antennas or antenna elements.

The baseband processing unit 520 takes charge of conversion between baseband signals and bit streams according to the physical layer standard of the system. For example, the baseband processing unit 520 encodes and modulates a transmission bit stream to generate complex conjugate symbols in the data transmission mode. The baseband processing unit 520 also demodulates and decodes the baseband signal from the RF processing unit 510 to recover the received bit stream in the data reception mode. In the case of adopting the OFDM scheme, the baseband processing unit 520 encodes and modulates the transmission bit stream to generate complex conjugate symbols, maps the complex conjugate symbols to subcarriers, performs an inverse IFFT operation, and inserts a CP to generate the OFDM symbols in the data transmission mode. Also, the baseband processing unit 520 separates the baseband signal from the RF processing unit 510 in a unit of an OFDM symbol, recovers signals mapped to the subcarriers through a FFT operation, and demodulates and decodes the signals to recover the received bit stream in the data reception mode. The baseband processing unit 520 and the RF processing unit 510 transmit and receive signals as described above. Accordingly, the base processing unit 520 and the RF processing unit 510 may be interchangeably referred to as a transmitter/receiver, a transceiver, and a communication unit.

The backhaul communication unit 530 provides an interface for communication with other nodes in the network. That is, the backhaul communication unit 530 converts a bit stream transmitted from the eNB to another node, e.g., secondary eNB and core network, to a physical signal and converts a physical signal received from another node to a bit stream.

The storage unit 540 stores data including basic programs for operation of the primary eNB, application programs, and setting information. In particular, the storage unit 540 may store the information on bearers allocated to the connected UE and measurement results reported by the connected UEs. The storage unit 540 may also store the information on when to activate or deactivate the multi-connectivity to the UE. The storage unit 540 may also provide the stored data in reply to a request from the control unit 550. The control unit 550 controls the overall operations of the eNB. For example, the control unit 550 transmits/receives signals via the baseband processing unit 520 and the RF processing unit 510 or the backhaul communication unit 530. The control unit 550 writes and reads data to and from the storage unit 540. For this purpose, the control unit 550 may include at least one processor. According to an embodiment of the present disclosure, the control unit 550 may control the eNB to take an action required for the UE to perform the operations described with reference to FIG. 3.

According to an embodiment, in the LTE system, the PHY layer operates in 10 ms radio frames and there are two types of radio frame structures.

Type 1: used for Frequency Division Duplex (FDD)
Type 2: used for Time Division Duplex (TDD)

Both of the two types of radio frames have a length of 10 ms, and one radio frame is divided into 10 subframes of 1 ms each, and 1 ms subframe is referred to as transmission time interval. That is, one radio frame consists of 10 subframes indexed 0 to 9.

In the FDD mode, the uplink and downlink are separated in the frequency domain, and each of the uplink and downlink radio frames consists of 10 subframes.

In the TDD mode, one radio frame consists of 10 subframes including at least one downlink subframe, at least one uplink subframe, and at least one special subframe, the special subframe consisting of a downlink pilot time slot (DwPTS), a guard period (GP), and an uplink pilot time slot (UpPTS) as a switching point between downlink and uplink transmission. The lengths of DwPTS, GP, and UpPTS are configurable, and the total length of the DwPTS, GP, and UpPTS is equal to 1 ms.

Figure 6:
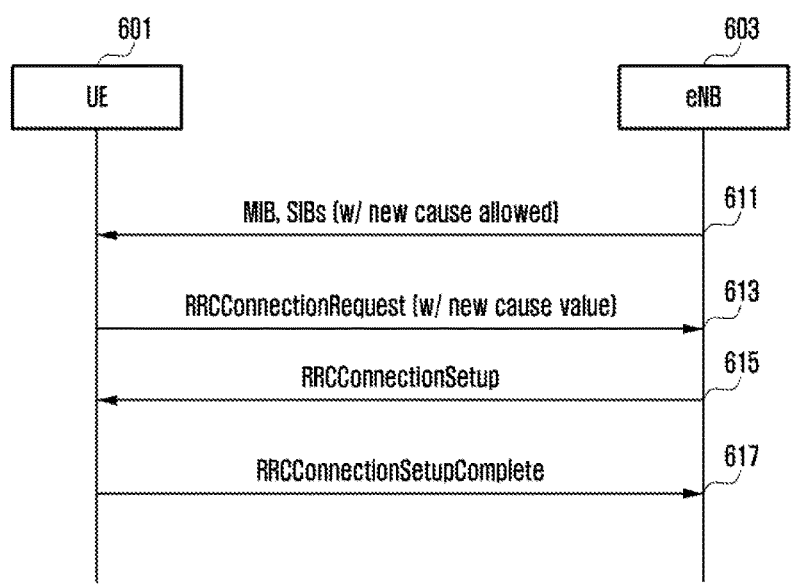
FIG. 6 is a message flow diagram illustrating a method for a UE to connect to an LTE network for the VoLTE service according to an embodiment of the present disclosure.

FIG. 6 is a message flow diagram illustrating a method for a UE to connect to an LTE network for the VoLTE service according to an embodiment of the present disclosure.

Referring to FIG. 6, if the UE 601 enters the coverage of the LTE eNB 603, it may receive system information broadcast by the eNB at operation 611. The system information is carried by a master information block (MIB) and a plurality of system information blocks (SIBs). The SIB is divided into SIB1, SIB2, SIB3, etc. each carrying different system information. In the case that the LTE eNB 603 has a capability of distinguishing the VoLTE service from other services, it may include a first indicator (VoIP cause value use permission indicator) in a predetermined SIB (e.g., SIB2).

Accordingly, if the UE 601 has the VoLTE service capability, it may determine whether the predetermined SIB includes the first indicator.

In the case that the UE 601 supports the VoLTE service, in order to attempt connection establishment for the VoLTE service, if the first indicator is included in a predetermined SIB, the UE 601 may transmit at operation 613 an RRC message, i.e. the RRCConnectionRequest message, including the EstablishmentCause set to the second value (forVoIP) defined newly. If the UE attempts to connect to the eNB for a certain service other than the VoLTE service or, although attempting to connect to the eNB for the VoLTE service, if the first indicator is not included in a predetermined SIB, the EstablishmentCause may be set to the first value (mo-Data). The RRCConnectionRequest message according to an embodiment is formatted as an example as follows.

The VoLTE capable UE may notify the LTE network of the cause of the connection to the LTE network in order for the LTE network to determine whether to allow the connection.

Figure 7:
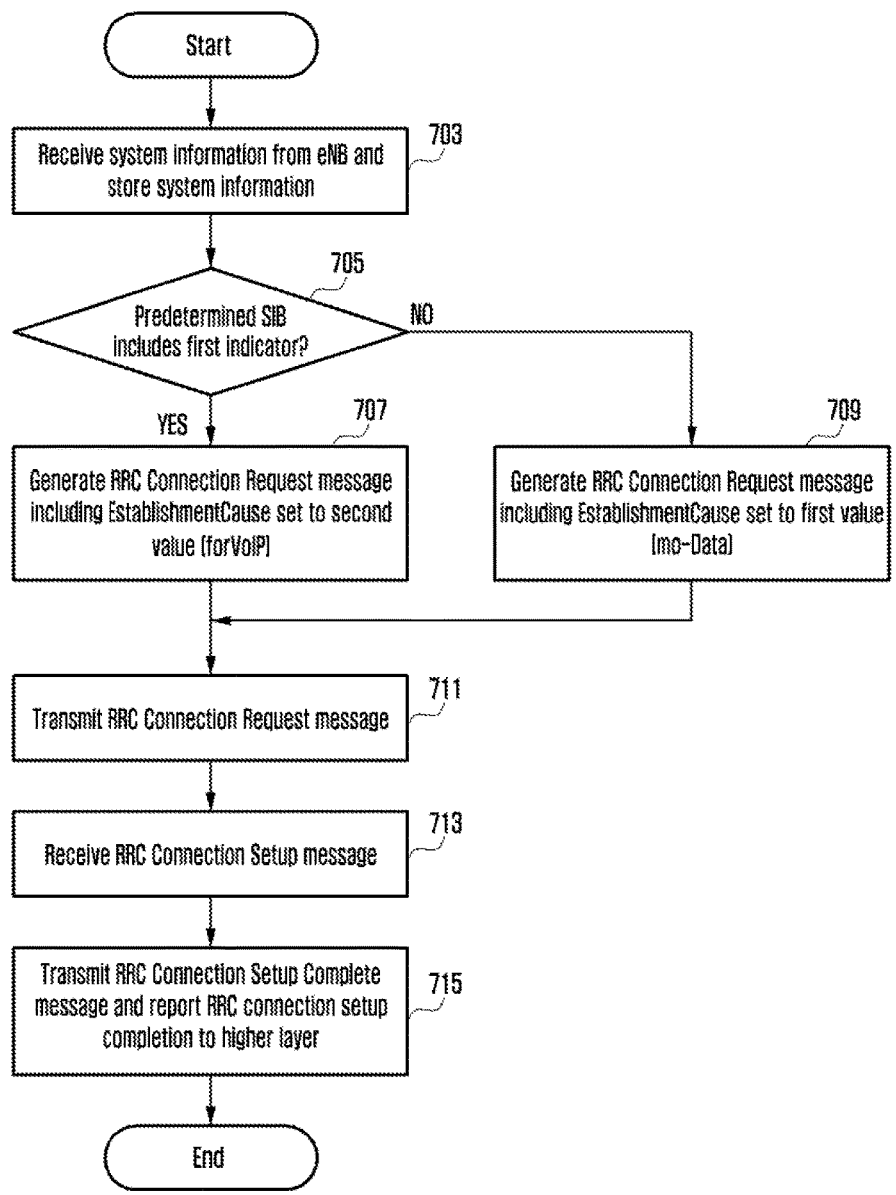
FIG. 7 is a flowchart illustrating a UE operation of a method for a UE to connect to an LTE network for the VoLTE service according to an embodiment of the present disclosure.

FIG. 7 is a flowchart illustrating a UE operation of a method for a UE to connect to an LTE network for the VoLTE service according to an embodiment of the present disclosure.

Referring to FIG. 7, the UE (e.g., UE 601 shown in FIG. 6) receives the system information broadcast by the eNB (e.g., eNB 603 shown in FIG. 6) and stores the system information for use in checking the information on the corresponding cell at operation 703. At this time, the UE may determine whether a predetermined SIB (e.g., SIB2) includes the first indicator (VoIP cause value use permission indicator) at operation 705. The predetermined service is a voice call service (VoIP).

In the case that the UE supporting the VoLTE service is attempting to connect to the eNB for the VoLTE service, if the predetermined SIB includes the first indicator, it may generate the RRC Connection Request message with the EstablishmentCause set to the second value (forVoIP) at operation 707. If the UE does not support the VoLTE service or if the UE is attempting to connect to the eNB for a service other than the VoLTE service or, even though it is attempting to connect to the eNB for the VoLTE service, if the predetermined SIB does not include the first indicator, the UE generates the RRC Connection Request message with the EstablishmentCause set to the first value (mo-Data) at operation 709.

Afterward, the UE may send the eNB the RRC Connection Request message at operation 711. Next, the UE may receive an RRC Connection Setup message from the eNB in

```
                          RRCConnectionRequest message
    --ASN1START
    RRCConnectionRequest ::=            SEQUENCE {
    criticalExtensions                  CHOICE {
    rrcConnectionRequest-r8             RRCConnectionRequest-r8-IEs,
    criticalExtensionsFuture              SEQUENCE { }
    }
    }
    RRCConnectionRequest-r8-IEs ::=  SEQUENCE {
    ue-Identity                        InitialUE-Identity,
    establishmentCause                   EstablishmentCause,
    spare                              BIT STRING (SIZE (1))
    }
    InitialUE-Identity ::=             CHOICE {
    s-TMSI                               S-TMSI,
    randomValue                          BIT STRING (SIZE (40))
    }
    EstablishmentCause ::=             ENUMERATED {
                                       emergency, highPriorityAccess, mt-Access,
mo-Signalling,
                                       mo-Data, delayTolerantAccess-v1020,
spare2forVoIP, spare1}
    --ASN1STOP
```

If the RRCConnectionRequest message is received, the eNB 603 checks the connection establishment cause value in the message to determine whether to allow the connection of the UE and, if it is determined to allow the connection, sends the UE 601 a connection setup command at operation 615. This command may be transmitted in the RRCConnectionSetup message. Upon receipt of this message, the UE 601 may transmit an acknowledgement corresponding to the configuration command using the RRCConnectionSetupComplete message at operation 617.

reply at operation 713. If the RRC Connection Setup message is received, the UE may transmit or send the eNB an RRC Connection Setup Complete message and report the RRC connection setup completion to the higher layer at operation 715, and then the UE ends the connection setup procedure.

Figure 8:
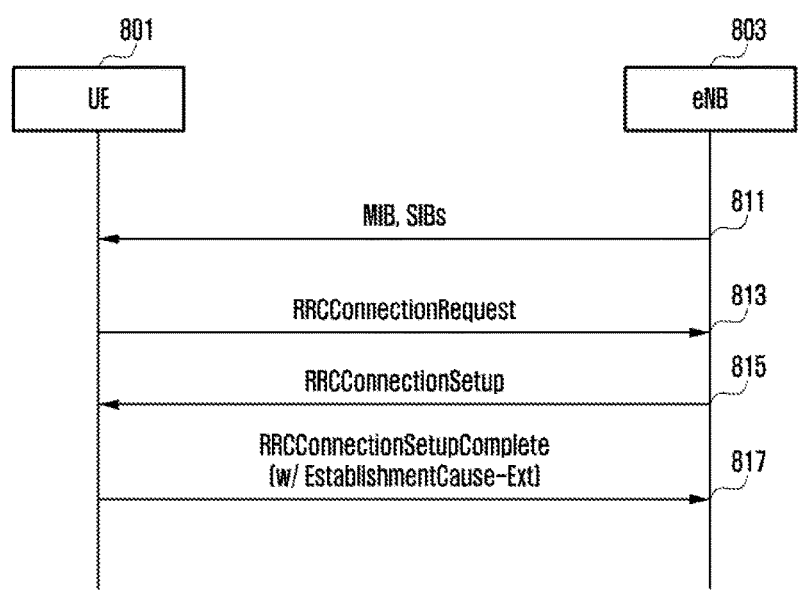
FIG. 8 is a message flow diagram illustrating a method for a UE to connect to an LTE network for VoLTE service according to an embodiment of the present disclosure.

FIG. 8 is a message flow diagram illustrating a method for a UE to connect to an LTE network for VoLTE service according to an embodiment of the present disclosure.

Referring to FIG. 8, if a UE 801 enters the coverage of an LTE eNB 803, it receives the system information, i.e., MIB and SIBs, broadcast by the eNB 803 at operation 811. Next, the UE 801 sends the eNB 803 an RRC message to request for a predetermined service, i.e., RRCConnectionRequest message at operation 813. At this time, the connection establishment cause (EstablishmentCause) may be set to a first value (mo-Data).

If the RRCConnectionRequest message is received, the eNB 803 checks the EstablishmentCause included in the RRCConnectionRequest message and, if the Establishment-Cause is set to a value indicating allowance of the UE connection, sends the UE 801 a connection establishment command at operation 815. The command is carried in an RRC message, i.e., RRCConnectionSetup message; and, if the RRCConnectionSetup message is received, the UE 801 sends the eNB 803 an acknowledgement using the RRCConnectionSetupComplete message at operation 817.

If the service requested by the UE 801 is a voice call service, the UE 801 may generate the RRCConnectionSetupComplete message with the EstablishmentCause-Ext set to the second value (forVoIP) and transmit the RRCConnectionSetupComplete message to the eNB 803. The eNB 803 may check the EstablishmentCause-Ext to determine whether to release the UE connection for the VoLTE service.

The VoLTE capable UE can notify that it is attempting to connect to the LTE network through the above procedure to help the LTE network determine whether to allow access to the LTE network.

Figure 9:
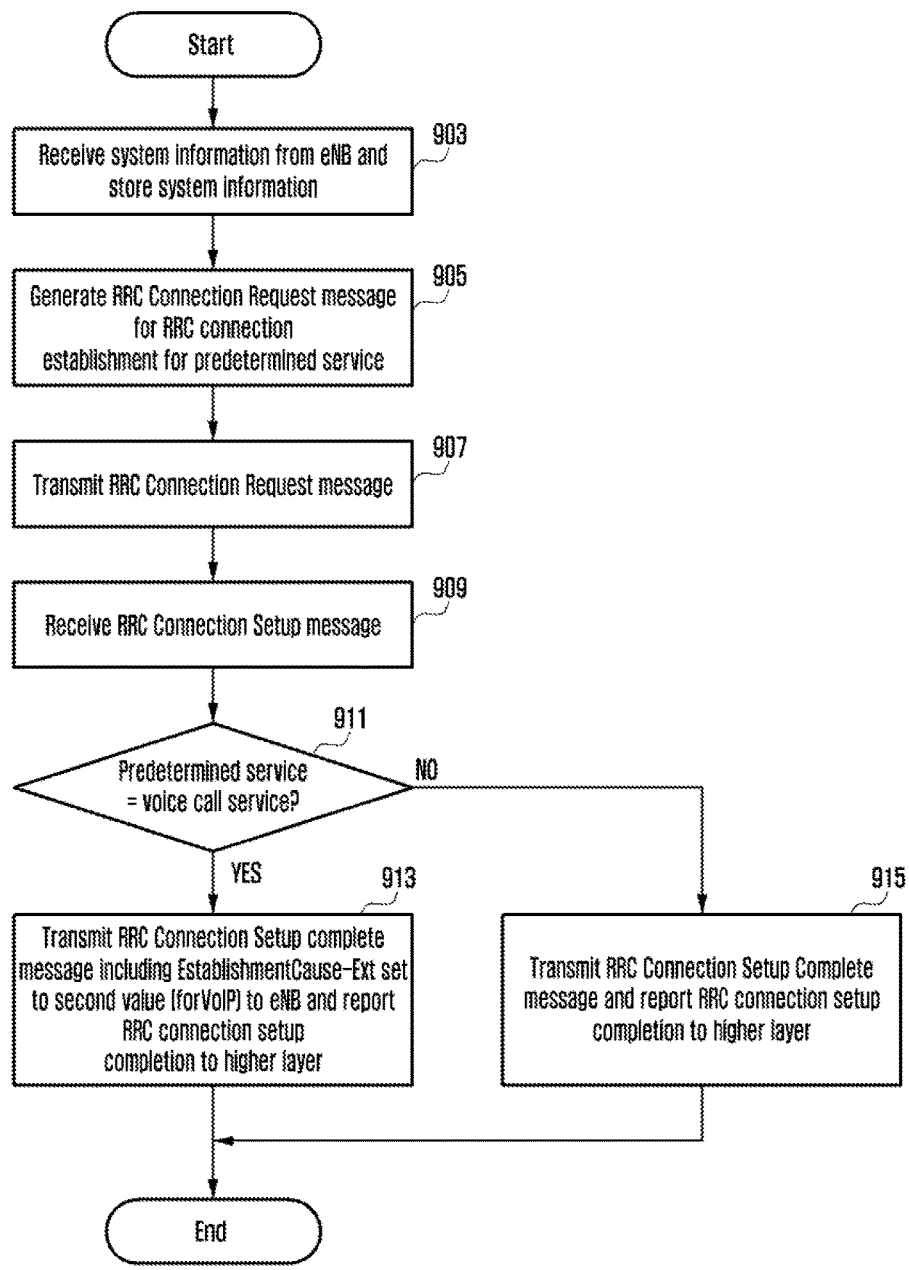
FIG. 9 is a flowchart illustrating a UE operation of a method for a UE to connect to an LTE network for the VoLTE service according to an embodiment of the present disclosure.

FIG. 9 is a flowchart illustrating a UE operation of a method for a UE to connect to an LTE network for the VoLTE service according to an embodiment of the present disclosure.

Referring to FIG. 9, the UE (e.g., UE 801 shown in FIG. 8) may receive system information from the eNB (e.g., eNB 803 shown in FIG. 8) to check the information on the corresponding cell at operation 903.

In the case of attempting to connect to the eNB for a predetermined service, the UE generates an RRC connection request message for RRC connection establishment at operation 905. At this time, the UE sets the EstablishmentCause to the first value (mo-Data) in the RRC Connection Request message.

Next, the UE may transmit or send the eNB the RRC Connection Request message to the eNB at operation 907.

The UE may receive in reply an RRC Connection Setup message from the eNB at operation 909. If the RRC Connection Setup message is received, the UE may determine at operation 911 whether the predetermined service is the VoLTE service. This determination may be made before the UE generates the RRC Connection Request message at operation 905. If the predetermined service is the voice call service (VoLTE service), the UE may transmit the RRC Connection Setup Complete message with the EstablishmentCause-Ext set to the second value (forVoIP) and report the RRC connection setup completion to the higher layer at operation 913 and the UE may end the connection setup procedure. If the predetermined service is not the voice call service, the UE may transmit RRC Connection Setup Complete message without the EstablishmentCause-Ext, and the UE may end the connection setup procedure. If the predetermined service is not the voice call service (VoLTE service), the UE may transmit the RRC Connection Setup Complete message and report RRC connection setup completion to a higher layer at operation 915, and the UE may end the connection setup procedure.

Figure 10:
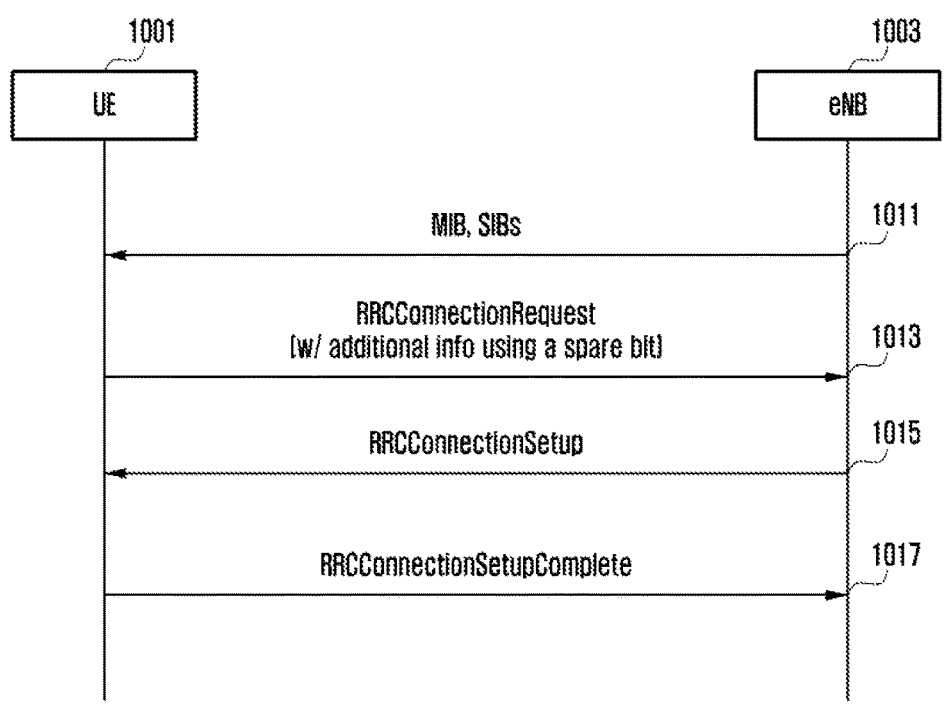
FIG. 10 is a message flow diagram illustrating a method for a UE to connect to an LTE network for the VoLTE service according to an embodiment of the present disclosure.

FIG. 10 is a message flow diagram illustrating a method for a UE to connect to an LTE network for the VoLTE service according to an embodiment of the present disclosure.

Referring to FIG. 10, if the UE 1001 enters the coverage of an eNB 1003, it may receive the system information, i.e., MIB and SIBs, broadcast by the eNB 1003 at operation 1011. Next, the UE 1001 may send the eNB 1003 an RRC message at operation 1013 to request for a predetermined service, i.e., RRCConnectionRequest message. At this time, the connection establishment cause (EstablishmentCause) may be set to a first value (mo-Data). If the service requested by the UE 1001 is a voice call service, the UE may include a first indicator in the message. The first indicator may be defined by a spare bit of the RRC Connection Request message, and the corresponding spare bit may be set to 1 for the VoLTE service or 0 for other services. The message is formatted as follows.

| RRCConnectionRequest message |
|---|
| --ASN1START |
| RRCConnectionRequest ::= SEQUENCE { |
| criticalExtensions    CHOICE { |
|    rrcConnectionRequest-r8    RRCConnectionRequest-r8-IEs, |
|    criticalExtensionsFuture   SEQUENCE { } |
| } |
| } |
| RRCConnectionRequest-r8-IEs ::=    SEQUENCE { |
| ue-Identity              InitialUE-Identity, |
| establishmentCause       EstablishmentCause, |
| ~~spare~~forVoIP              BIT STRING (SIZE (1)) |
| } |
| InitialUE-Identity ::=   CHOICE { |
| s-TMSI                   S-TMSI, |
| random Value              BIT STRING (SIZE (40)) |
| } |
| EstablishmentCause ::=   ENUMERATED { |
|    emergency, highPriorityAccess, mt-Access, mo-Signalling, |
|    mo-Data, delayTolerantAccess-v1020, spare2, spare1} |
| --ASN1STOP |

If the RRCConnectionRequest message is received, the eNB 1003 may check the EstablishmentCause included in the message to determine whether to allow access of the UE 1001 and, if the eNB 1003 is capable of identifying the VoLTE service, further check the spare bit to determine whether to allow access of the UE 1001.

If it is determined to allow access of the UE, the eNB 1003 may send the UE 1001 a connection setup command at operation 1015. The command is transmitted using an RRC message, i.e., RRCConnectionSetup message. The UE 1001 may transmit an acknowledgement message in response to the RRCConnectionSetup message, the acknowledgement message being transmitted using the RRCConnectionSetupComplete message at operation 1017.

Through the above procedure, a VoLTE capable UE notifies the LTE network of its attempt to connect to the LTE network in order to help the LTE network to determine whether to allow access of the UE.

Figure 11:
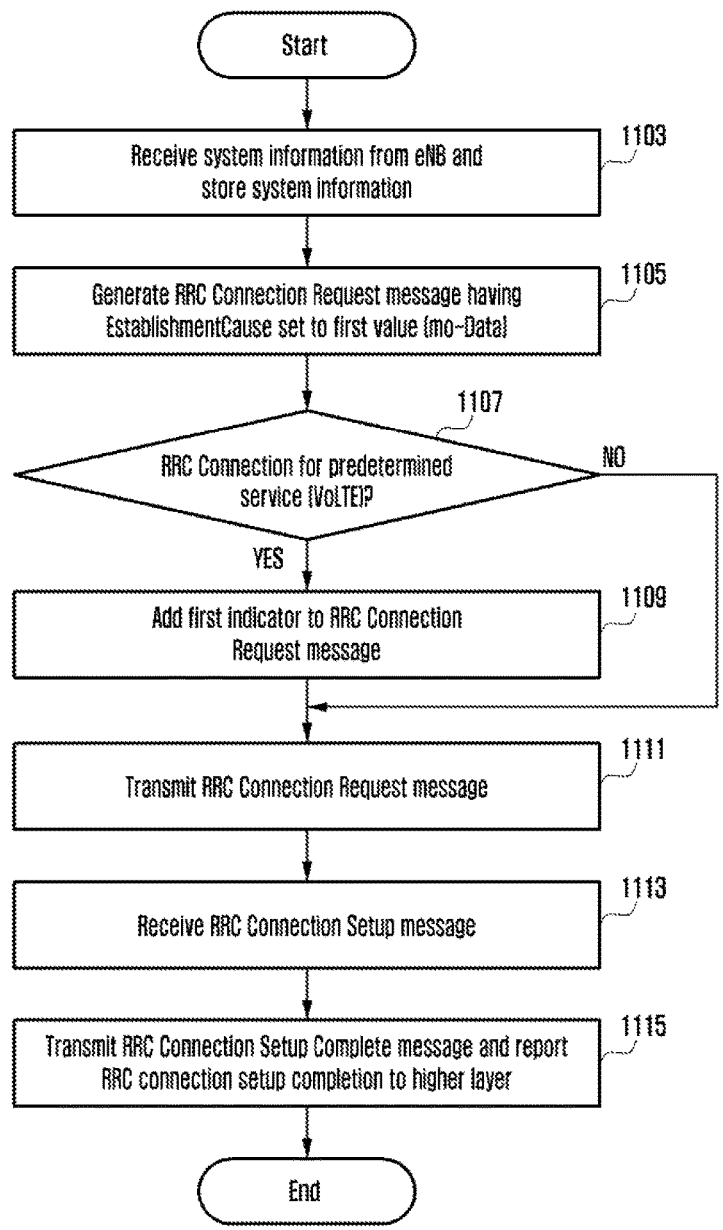
FIG. 11 is a flowchart illustrating a UE operation of a method for the UE to connect to an LTE network for the VoLTE service according to an embodiment of the present disclosure.

FIG. 11 is a flowchart illustrating a UE operation of a method for the UE to connect to an LTE network for the VoLTE service according to an embodiment of the present disclosure.

Referring to FIG. 11, the UE (e.g., UE 1001 in FIG. 10) may receive system information from an eNB (e.g., eNB 1003 in FIG. 10) and stores the system information for use in checking the information on the corresponding cell at operation 1103.

Afterward, when the UE attempts to connect to the eNB for a predetermined service, it may generate at operation 1105 an RRC Connection Request message for RRC connection establishment. In this case, the RRC Connection Request message may include EstablishmentCause set to the first value (mo-Data). The UE may determine at operation 1107 whether the predetermined service is a voice call service such as VoLTE. If it is determined that the predetermined service is a voice call service such as VoLTE, the UE includes the first indicator in the RRC Connection Request message at operation 1109. The first indicator may be determined by a spare bit of the RRC Connection Setup Request message of which the format has been described with reference to FIG. 10.

The UE may transmit the RRC Connection Request message to the eNB at operation 1111. In reply, the UE may receive an RRC Connection Setup message from the eNB at operation 1113. If the RRC Connection Setup message is received, the UE may transmit an RRC Connection Setup Complete message as an acknowledgement of the receipt of the RRC Connection Setup message to the eNB and report the RRC connection setup completion to the higher layer at operation 1115, and thus, the connection setup procedure ends.

Figure 12:
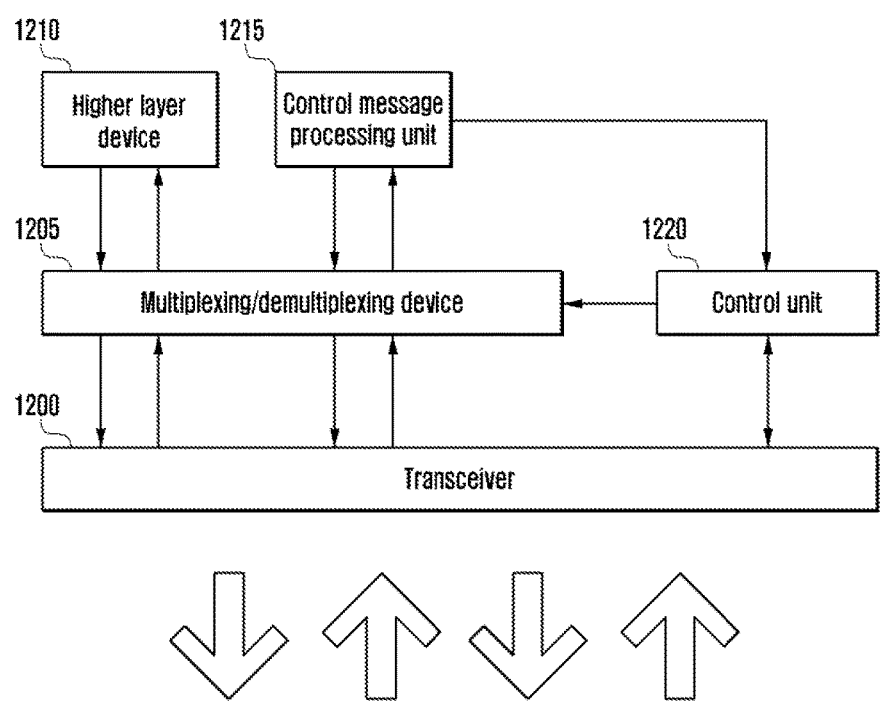
FIG. 12 is a block diagram illustrating a configuration of a UE according to an embodiment of the present disclosure.

FIG. 12 is a block diagram illustrating a configuration of a UE according to an embodiment of the present disclosure.

Referring to FIG. 12, the UE may include a transceiver 1200, a control unit 1220, a multiplexer/demultiplexer 1205, a control message processing unit 1215, and a higher layer processing device 1210. For example, the control unit 1220 may take charge of the functions of at least one of the multiplexer/demultiplexer and the higher layer processing device, and the control unit 1220 may include at least one processor.

The UE communicates data with a higher layer processing device 1210 and transmits/receives control messages by means of the control message processing unit 1215. In the case that the UE is receiving a control signal or data from an eNB, the control unit 1220 controls the multiplexer/demultiplexer 1205 to multiplex the data and the transceiver 1200 to transmit the multiplexed data. In the case of receiving signals, the control unit 1220 controls the transceiver 1200 to receive a physical signal and controls the multiplexer/demultiplexer 1205 to demultiplex the received signal and deliver the demultiplexed signal to the higher layer processing device 1210 or the control message processing unit 1215 according to the message information. For example, the aforementioned RRC layer messages are control messages.

Although the description is directed to the case where the UE is configured with a plurality of blocks that take charge of different functions, such configuration is just an example and does not limit the present disclosure. For example, the control unit 1220 may perform the functions of the multiplexer/demultiplexer 1205.

According to an embodiment of the present disclosure, the control unit 1220 may control the operation of the UE in association with the various methods for the UE to connect to the LTE network for the VoLTE service as described with reference to FIGS. 6, 7, 8, 9, 10, and 11.

For example, the control unit 1220 may receive an SIB (e.g., type 2) including configuration information from the eNB.

The control unit 1220 may set the establishment cause (EstablishmentCause) to a value based on whether the SIB includes the first indicator indicating that the use of the value indicating the voice service as the establishment cause is requested to terminals. For example, if the UE supports the value indicating the voice service as the establishment cause and is attempting RRC connection for the voice service and the SIB includes the first indicator, the control unit 1220 may set the establishment cause to the value indicating the voice service connection.

The control unit 1220 may send the eNB the RRC Connection Request message including the establishment cause.

Figure 13:
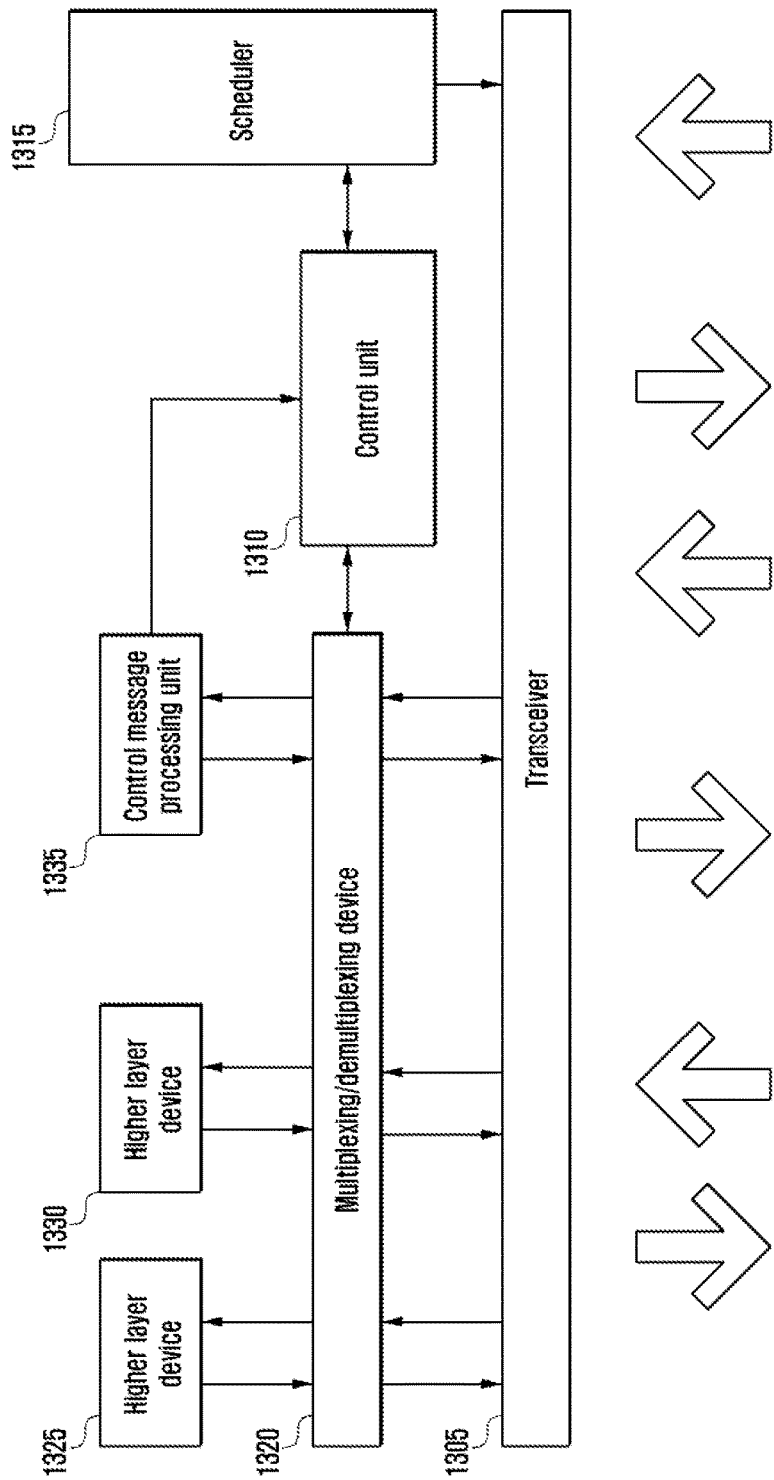
FIG. 13 is a block diagram illustrating a configuration of an eNB according to an embodiment of the present disclosure.

FIG. 13 is a block diagram illustrating a configuration of an eNB according to an embodiment of the present disclosure.

Referring to FIG. 13, the eNB includes a transceiver 1305, a control unit 1310, a multiplexer/demultiplexer 1320, a control message processing unit 1335, and various higher layer devices 1325 and 1330. For example, the control unit 1310 may take charge of the functions of at least one of the multiplexer/demultiplexer, the higher layer device, the control message processing unit, and the scheduler; the control unit 1310 may include at least one processor.

The transceiver 1305 transmits data and control signals on a downlink carrier and receives data and control signals on an uplink carrier. In the case that multiple carriers are configured, the transceiver 1305 transmits/receives the data and control signals on the multiple carriers. The multiplexer/demultiplexer 1320 multiplexes the data from the higher layer processing units 1325 and 1330 and/or the control message processing unit 1335 and demultiplexes the data received by the transceiver 1505, the demultiplexed data being delivered to at least one of the higher layer processing units 1325 and 1330, the control message processor 1335, and the control unit 1310. The control message processing unit 1335 may process the control message transmitted by the UE to take a necessary action or generate a control message to be transmitted to the UE to the lower layer.

The higher layer processing unit 1325 (or higher layer processing unit 1330) may be established per UE per service to process data of a user service such as FTP and VoIP and transfer the processed data to the multiplexer/demultiplexer 1320 or to process the data from the multiplexer/demultiplexer 1320 and deliver the processed data to a service application on the higher layer. The scheduler 1315 allocates transmission resources to the UE at an appropriate timing in consideration of the buffer state, channel condition, and active time of the UE and controls the transceiver to process the signals transmitted by the UE and to transmit signals to the UE.

According to an embodiment of the present disclosure, the control unit 1310 may control the operations of the eNB in association with various methods for the UE to connect to the LTE network for VoLTE service as described with reference to FIGS. 6 to 11.

For example, the control unit 1310 may control to send the UE an SIB (e.g., type 2) including configuration information.

At this time, the SIB may or may not include the first indicator indicating that the use of the value indicating the voice service (VoIP cause value use allowance indicator) as the establishment cause (EstablishmentCause) is requested to terminals. The establishment cause may be set to a value based on whether the first indicator is included in the SIB. For example, if the UE supports the value indicating the voice service as the establishment cause and is attempting RRC connection for the voice service and the SIB includes the first indicator, the establishment cause may be set to a value indicating the voice service.

The control unit 1310 may control to receive the RRC Connection request message including the establishment cause from the UE.

As described above, the present disclosure is advantageous in terms of improving the quality of VoLTE service by enabling an eNB to distinguish an LTE network access attempt for VoLTE service from an LTE network access attempt for other communication services and to give priority to the VoLTE service, thereby improving the quality of voice call service.

The methods specified in the claims and specification can be implemented by hardware, software, or a combination of them.

In the case of being implemented in software, it may be possible to store at least one program (software module) in a computer-readable storage medium. The at least one program stored in the computer-readable storage medium may be configured for execution by at least one processor embedded in an electronic device. The at least one program includes instructions executable by the electronic device to perform the methods described in the claims and specification of the present disclosure.

Such a program (software module or software program) may be stored in a non-volatile memory such as random access memory (RAM) and flash memory, read only memory (ROM), electrically erasable programmable ROM (EEPROM), a magnetic disc storage device, a compact disc-ROM (CD-ROM), digital versatile discs (DVDs) or other type of optical storage device, and a magnetic cassette. It may also be possible to store the program in a memory device implemented in combination of part or whole of the aforementioned media. The storage unit may include a plurality of memories.

The program may be stored in an attachable storage device accessible through a communication network implemented as a combination of Internet, intranet, local area network (LAN), WLAN, and storage area network (SAN). The storage device may be attached to the device performing the methods according to embodiments of the present disclosure by means of an external port. It may also be possible for a separate storage device installed on a communication network to attach to the device performing the methods according to embodiments of the present disclosure.

In the various embodiments of the present disclosure, the components are described in singular or plural forms depending on the embodiment. However, the singular and plural forms are selected appropriately for the proposed situation just for explanatory convenience without any intention of limiting the present disclosure thereto; thus, the singular form includes the plural forms as well, unless the context clearly indicates otherwise.

While the present disclosure has been shown and described with reference to various embodiments thereof, it will be understood by those skilled in the art that various changes in form and details may be made therein without departing from the scope and spirit of the present disclosure as defined by the present claims and their equivalents.

What is claimed is:

1. A method of a terminal in a wireless communication system, the method comprising:
    receiving, from a base station, a control message including a first indicator indicating that the terminal is requested to use a first value indicating a voice service as an establishment cause;
    transmitting, to the base station, a radio resource control (RRC) connection request message for a service, wherein the RRC connection request message includes a first establishment cause which is set to a second value indicating a mobile originated data service;
    receiving, from the base station, an RRC connection setup message; and
    transmitting, to the base station, an RRC connection complete message, wherein the RRC connection complete message includes a second establishment cause which is set to the first value when the service corresponds to the voice service.

2. The method of claim 1, wherein the control message comprises a system information block type 2.

3. The method of claim 1, wherein the second establishment cause included in the RRC connection complete message is set to the first value indicating the voice service when the control message includes the first indicator and the terminal supports the first value indicating the voice service as the establishment cause.

4. A method of a base station in a wireless communication system, the method comprising:
    transmitting, to a terminal, a control message including a first indicator indicating that the terminal is requested to use a first value indicating a voice service as an establishment cause;
    receiving, from the terminal, a radio resource control (RRC) connection request message for a service, wherein the RRC connection request message includes a first establishment cause which is set to a second value indicating a mobile originated data service;
    transmitting, to the terminal, an RRC connection setup message; and
    receiving, from the terminal, an RRC connection complete message, wherein the RRC connection complete message includes a second establishment cause which is set to the first value when the service corresponds to the voice service.

5. The method of claim 4, wherein the control message comprises a system information block type 2.

6. A terminal in a wireless communication system, the terminal comprising:
    a transceiver for transmitting and receiving signals; and
    at least one processor configured to:
        receive, from a base station, a control message including a first indicator indicating that the terminal is requested to use a first value indicating a voice service as an establishment cause,
        transmit, to the base station, a radio resource control (RRC) connection request message for a service, wherein the RRC connection request message includes a first establishment cause which is set to a second value indicating a mobile originated data service,
        receive, from the base station, an RRC connection setup message, and transmit, to the base station, an RRC connection complete message, wherein the RRC connection complete message includes a second establishment cause which is set to the first value when the service corresponds to the voice service.

7. The terminal of claim 6, wherein the control message comprises a system information block type 2.

8. The terminal of claim 6, wherein the second establishment cause included in the RRC connection complete message is set to the first value indicating the voice service when the control message includes the first indicator and the terminal supports the first value indicating the voice service as the establishment cause.

9. A base station in a wireless communication system, the base station comprising:
   a transceiver for transmitting and receiving signals; and
   at least one processor configured to:
      transmit, to a terminal, a control message including a first indicator indicating that the terminal is requested to use a first value indicating a voice service as an establishment cause,
      receive, from the terminal, a radio resource control (RRC) connection request message for a service, wherein the RRC connection request message includes a first establishment cause which is set to a second value indicating a mobile originated data service,
      transmit, to the terminal, an RRC connection setup message, and
      receive, from the terminal, an RRC connection complete message, wherein the RRC connection complete message includes a second establishment cause which is set to the first value when the service corresponds to the voice service.

10. The base station of claim 9, wherein the control message comprises a system information block type 2.

\* \* \* \* \*